United States Patent
Wu

(10) Patent No.: US 10,382,924 B2
(45) Date of Patent: Aug. 13, 2019

(54) M2M NODE MANAGEMENT METHOD AND APPARATUS, AND COMPUTER STORAGE MEDIUM

(71) Applicant: ZTE Corporation, Shenzhen, Guangdong (CN)

(72) Inventor: Hao Wu, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 80 days.

(21) Appl. No.: 15/523,706

(22) PCT Filed: Apr. 13, 2015

(86) PCT No.: PCT/CN2015/076469
§ 371 (c)(1),
(2) Date: May 2, 2017

(87) PCT Pub. No.: WO2016/070571
PCT Pub. Date: May 12, 2016

(65) Prior Publication Data
US 2018/0199175 A1    Jul. 12, 2018

(30) Foreign Application Priority Data

Nov. 3, 2014   (CN) .......................... 2014 1 0612521

(51) Int. Cl.
*H04W 4/70* (2018.01)
*H04W 8/24* (2009.01)
(Continued)

(52) U.S. Cl.
CPC ............... *H04W 4/70* (2018.02); *H04W 8/24* (2013.01); *H04W 24/02* (2013.01); *H04W 28/16* (2013.01);
(Continued)

(58) Field of Classification Search
CPC ....................................................... H04W 4/70
(Continued)

(56) References Cited

U.S. PATENT DOCUMENTS

2015/0029894 A1* 1/2015 Lu ........................... H04W 4/70
370/259
2016/0007137 A1* 1/2016 Ahn ....................... H04W 4/70
370/254
(Continued)

FOREIGN PATENT DOCUMENTS

CN    103618800 A     3/2014
CN    104093118 A     10/2014
(Continued)

OTHER PUBLICATIONS

International Search Report in international application No. PCT/CN2015/076469, dated Jun. 26, 2015, 2 pgs.
(Continued)

*Primary Examiner* — Peter G Solinsky
(74) *Attorney, Agent, or Firm* — Cooper Legal Group, LLC

(57) ABSTRACT

Disclosed are a method and an apparatus for managing a Machine To Machine (M2M) node. On a registered Common Service Entity (CSE) of an Application Entity (AE) or a CSE, an AE resource created for the AE or a CSE resource created for the CSE is associated with an M2M node resource created for an M2M node where the AE or the CSE is located. When the M2M node resource on the registered CSE is changed, the AE resource or the CSE resource associated with the changed M2M node resource is updated.

9 Claims, 1 Drawing Sheet

When an M2M node resource is created, set a value of a logical unit identity attribute in the created M2M node resource, and set the value as an AE identity or a CSE identity carried in an M2M node resource creation request — 101

Search for, in the registered CSE locally, an AE resource having the same AE identity or a CSE resource having the same CSE identity as the created M2M node resource according to the value of the logical unit identity attribute in the created M2M node resource, and update a value of a node connection attribute of the searched AE resource or CSE resource to the address of the created M2M node resource — 102

(51) Int. Cl.
*H04W 24/02* (2009.01)
*H04W 28/16* (2009.01)
*H04W 48/16* (2009.01)
*H04W 60/00* (2009.01)
*H04W 64/00* (2009.01)
*H04W 76/14* (2018.01)
*H04W 76/30* (2018.01)

(52) U.S. Cl.
CPC ........... *H04W 60/00* (2013.01); *H04W 64/00* (2013.01); *H04W 76/30* (2018.02); *H04W 48/16* (2013.01); *H04W 76/14* (2018.02)

(58) Field of Classification Search
USPC ......................................................... 370/329
See application file for complete search history.

(56) References Cited

U.S. PATENT DOCUMENTS

| | | | |
|---|---|---|---|
| 2016/0249206 A1* | 8/2016 | Yu | H04W 8/24 |
| 2016/0294886 A1 | 10/2016 | Wu | |
| 2016/0302085 A1* | 10/2016 | Park | H04L 67/303 |
| 2016/0366032 A1* | 12/2016 | Tao | H04W 4/70 |
| 2016/0366663 A1* | 12/2016 | Wang | H04W 4/70 |
| 2017/0019749 A1* | 1/2017 | Koshimizu | H04W 4/70 |
| 2017/0118117 A1* | 4/2017 | Kamel | H04L 45/306 |
| 2017/0257726 A1* | 9/2017 | Jeong | H04W 60/04 |
| 2017/0257741 A1* | 9/2017 | Kim | H04W 4/023 |
| 2017/0311303 A1* | 10/2017 | Ahn | H04W 72/0406 |
| 2017/0311308 A1* | 10/2017 | Park | H04W 4/70 |
| 2018/0213378 A1* | 7/2018 | Brown | H04W 4/70 |

FOREIGN PATENT DOCUMENTS

| | | |
|---|---|---|
| CN | 104104713 A | 10/2014 |
| EP | 2961122 A1 | 12/2015 |
| EP | 3060018 A1 | 8/2016 |
| WO | 2014129802 A1 | 8/2014 |
| WO | 2014169804 A1 | 10/2014 |

OTHER PUBLICATIONS

English Translation of the Written Opinion of the International Search Authority in international application No. PCT/CN2015/076469, dated Jun. 26, 2015, 6 pgs.

Supplementary European Search Report in European application No. 15857622.3, dated Sep. 5, 2017, 10 pgs.

"OneM2M Functional Architecture Intrim Draft", Feb. 2014, Rajesh Bhalla et al., OneM2M Technical Specification, Document No. oneM2M-TS-0001—V-0.4.1, Retrieved from the Internet:URL: URL =http://member.onem2m.org/Application/documentapp/downloadimmediate/default.aspx?docI0=5168, 84 pgs.

"Toward a Standardized Common M2M Service Layer Platform: Introduction to oneM2M", Jun. 2014, Jorg Swetina, Guang Lu, Philip Jacobs, Francois Ennesser and Jaeseung Song, IEEE Wireless Communications, IEEE Service Center, Piscataway, NJ, US, vol. 21, No. 3, 8 pgs.

* cited by examiner

M2M NODE MANAGEMENT METHOD AND APPARATUS, AND COMPUTER STORAGE MEDIUM

TECHNICAL FIELD

The disclosure relates to management for a Machine Type Communication (MTC) device, and more particularly to a method and an apparatus for managing a Machine To Machine (M2M) node and a computer storage medium.

BACKGROUND

The M2M communication network is composed of M2M nodes and a bearer network, in which each of the M2M nodes, as a physical device, implements the M2M service via communications among the contained logical units. An M2M node includes an Application Entity (AE) or a Common Service Entity (CSE). The AE is a logical unit that performs an actual M2M application. The CSE is a logical unit that manages the AE and M2M nodes and provides the AE with services.

AE needs to be registered on the CSE so as to enjoy the service provided by its registered CSE. The CSE registered by this AE is called the registered CSE of the AE. At the same time, since CSEs may provide different services, a CSE (simply referred to as CSE1 for the convenience of description) may also be registered in another CSE (simply referred to as CSE2 for the convenience of description) so as to enjoy the service provided by another CSE, and the CSE2 is also simply referred to as the registered CSE of the CSE1.

The CSE manages the AE and M2M nodes in such a manner that the CSE creates resources for the AE and M2M nodes and provides services for reading, updating, and deleting resources.

In the existing M2M service, the AE is a logical unit and is a kind of software, and the M2M node is a hardware device. Therefore, the management of the AE (resource deletion, creation, updating, reading, etc.) and management of the M2M node (firmware version updating, storage management, power management, etc.) are independent of each other. In practical application, when the M2M node is removed or updated, only the management operation over the M2M node is usually performed. That is, the resource of the M2M node is deleted, but the management operation over the AE carried by the M2M node is not performed at the same time so that the AE carried by the deleted M2M node still exists on its registered CSE, and this AE is a failed AE.

Similarly, in the existing M2M service, the CSE is also a logical unit and is a kind of software, and the M2M node is a hardware device. Therefore, the management of the CSE (resource deletion, creation, updating, reading, etc.) and management of the M2M node (firmware version updating, storage management, power management, etc.) are independent of each other. In practical application, when the M2M node is removed or updated, only the management operation over the M2M node is usually performed. That is, the resource of the M2M node is deleted, but the management operation over the CSE carried by the M2M node is not performed at the same time so that the CSE carried by the deleted M2M node still exists on its registered CSE, and this CSE is a failed CSE.

Since the registered CSE manages a large number of M2M nodes and the AEs or CSEs carried by the M2M nodes, the number of failed AEs or CSEs stored in the registered CSE will increase as time goes on, and the failed AEs or CSEs will occupy a larger storage space in the registered CSE, which is disadvantageous for saving the storage space in the registered CSE.

SUMMARY

In order to solve the existing technical problems, the disclosure provides a method and an apparatus for managing a M2M node and a computer storage medium.

An embodiment of the disclosure provides a method for managing a M2M node. When an M2M node resource is created, a value of a logical unit identity attribute in the created M2M node resource is set and the value is set as an AE identity or a CSE identity carried in an M2M node resource creation request. An AE resource having the same AE identity or a CSE resource having the same CSE identity as the created M2M node resource is searched in the registered CSE locally according to the value of the logical unit identity attribute in the created M2M node resource, and a value of a node connection attribute of the searched AE resource or CSE resource is updated to the address of the created M2M node resource.

In the above solution, the M2M node resource to which the value of the node connection attribute of the AE resource or CSE resource points before being updated is deleted, when the AE resource having the same AE identity or the CSE resource having the same CSE identity as the created M2M node resource is searched and the value of the node connection attribute of the searched AE resource or CSE resource is not null.

Alternatively, other M2M node resources having the same logical unit identity attribute value are searched in the registered CSE locally according to the value of the logical unit identity attribute in the created M2M node resource and the searched other M2M node resources are deleted from the registered CSE locally.

In the above solution, the M2M node resource address carried in the resource deletion request is acquired when the M2M node resource deletion request is received. The value of the logical unit identity attribute in the M2M node resource corresponding to the address is searched. The AE resource with the AE identity same as the value of the logical unit identity attribute or the CSE resource with the CSE identity same as the value of the logical unit identity attribute is acquired. The acquired AE resource or CSE resource is deleted from the registered CSE locally. The M2M node resource corresponding to the M2M node resource address carried in the resource deletion request is deleted from the registered CSE locally.

An embodiment of the disclosure also provides an apparatus for managing a M2M node applied to a registered CSE of an AE or a CSE. The apparatus includes a resource creation unit to, when a M2M node resource is created, set a value of a logical unit identity attribute in the created M2M node resource, and set the value as an AE identity or a CSE identity carried in the M2M node resource creation request; and a resource management unit to search for, in the registered CSE locally, an AE resource having the same AE identity or a CSE resource having the same CSE identity as the created M2M node resource according to the value of the logical unit identity attribute in the created M2M node resource, and update a value of a node connection attribute of the searched AE resource or CSE resource to the address of the created M2M node resource.

In the above solution, the resource management unit is to delete the M2M node resource to which the value of the node connection attribute of the AE resource or CSE resource points before being updated, when the AE resource having the same AE identity or the CSE resource having the same CSE identity as the created M2M node resource is searched and the value of the node connection attribute of the searched AE resource or CSE resource is not null.

Alternatively, the resource management unit is to search for, in the registered CSE locally, other M2M node resources having the same logical unit identity attribute value according to the value of the logical unit identity attribute in the created M2M node resource and delete the searched other M2M node resources from the registered CSE locally.

In the above solution, the Resource management unit is to acquire the M2M node resource address carried in the resource deletion request when the M2M node resource deletion request is received, search for the value of the logical unit identity attribute in the M2M node resource corresponding to the address, acquire the AE resource with the AE identity same as the value of the logical unit identity attribute or the CSE resource with the CSE identity same as the value of the logical unit identity attribute, and delete the acquired AE resource or CSE resource from the registered CSE locally, and delete the M2M node resource corresponding to the M2M node resource address carried in the resource deletion request from the registered CSE locally.

An embodiment of the disclosure also provides a computer storage medium including a set of computer-executable instructions for performing the method for managing a M2M node according to an embodiment of the disclosure.

The disclosure provides a method and an apparatus for managing a M2M node and a computer storage medium, in which the AE or CSE is associated with the M2M node that carries the AE or CSE on their registered CSE, and when deleting or replacing the M2M node, the corresponding deletion operation will be performed over the AE or CSE carried by the deleted or replaced M2M node on the registered CSE, thus avoiding the storage of the failed AE or CSE resource in the registered CSE and effectively managing the storage space in the CSE.

DETAILED DESCRIPTION

The technical solution of the disclosure will now be described in further detail with reference to the accompanying drawings and specific embodiments.

An embodiment of the disclosure provides a method for managing a M2M node. On a registration CSE of an AE or a CSE, an AE resource created for the AE or a CSE resource created for the CSE is associated with a M2M node resource created for an M2M node where the AE or the CSE is located. When the M2M node resource on the registered CSE is changed, the AE resource or the CSE resource associated with the changed M2M node resource is updated.

Embodiment One

Figure 1:
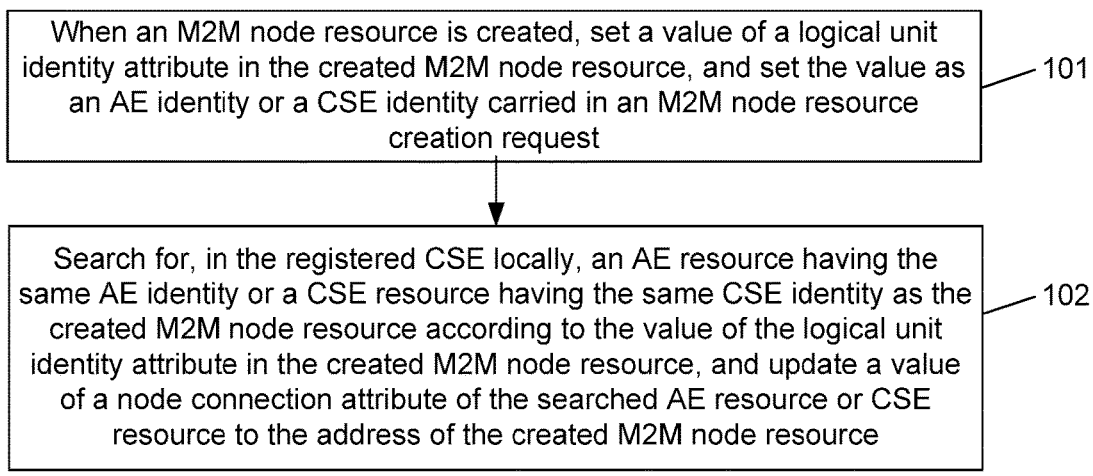
FIG. 1 is a flow diagram showing a method for managing a M2M node according to Embodiment One of the disclosure.
Figure 2:
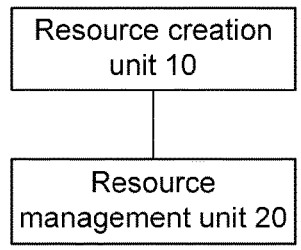
FIG. 2 is a structure schematic diagram illustrating an apparatus for managing a M2M node according to Embodiment Two of the disclosure.

The method for managing a M2M node provided according to Embodiment One of the disclosure is as shown in FIG. 1, mainly including the following steps.

At Step 101, when a M2M node resource is created, a value of a logical unit identity attribute in the created M2M node resource is set, and the value is set as an AE identity or a CSE identity carried in an M2M node resource creation request.

An initiator (e.g., an AE or a CSE) sends a resource creation request to the registered CSE thereof, and the request message contains:

(1) an identity of an AE or CSE; and (2) a resource type: the value being set as a "node."

After receiving the resource creation request, the registered CSE creates a resource of the "node" type. If the request message contains the identity of the AE, the attribute "AE identity" of the node resource is set as the identity of the AE in the request message. If the request message contains the identity of the CSE, the attribute "CSE identity" of the node resource is set as the identity of the CSE in the request message.

At Step 102, an AE resource having the same AE identity or a CSE resource having the same CSE identity as the created M2M node resource is searched in the registered CSE locally according to the value of the logical unit identity attribute in the created M2M node resource, and a value of a node connection attribute of the searched AE resource or CSE resource is updated to the address of the created M2M node resource.

In one embodiment, the M2M node resource to which the value of the node connection attribute of the AE resource or CSE resource points before being updated is deleted, when the AE resource having the same AE identity or the CSE resource having the same CSE identity as the created M2M node resource is searched and the value of the node connection attribute of the searched AE resource or CSE resource is not null.

Alternatively, other M2M node resources having the same logical unit identity attribute value are searched in the registered CSE locally according to the value of the logical unit identity attribute in the created M2M node resource, and the searched other M2M node resources are deleted from the registered CSE locally.

In one embodiment, the M2M node resource address carried in the resource deletion request is acquired when the M2M node resource deletion request is received. Then, the value of the logical unit identity attribute in the M2M node resource corresponding to the address is searched. The AE resource in which the AE identity is the same as the value of the logical unit identity attribute or the CSE resource in which the CSE identity is the same as the value of the logical unit identity attribute is acquired. The acquired AE resource or CSE resource is deleted from the registered CSE locally. The M2M node resource corresponding to the M2M node resource address carried in the resource deletion request is deleted from the registered CSE locally.

Embodiment Two

Corresponding to the method for managing a M2M node according to Embodiment One of the disclosure, Embodiment Two of the disclosure provides an apparatus for managing a M2M node applied to a registered CSE of an AE or a CSE. The apparatus includes a resource creation unit 10 and a resource management unit 20.

When an M2M node resource is created, the resource creation unit 10 sets a value of a logical unit identity attribute in the created M2M node resource, and sets the value as an AE identity or a CSE identity carried in the M2M node resource creation request.

The resource management unit 20 searches for, in the registered CSE locally, an AE resource having the same AE identity or a CSE resource having the same CSE identity as the created M2M node resource according to the value of the logical unit identity attribute in the created M2M node resource, and further updates a value of a node connection attribute of the searched AE resource or CSE resource to the address of the created M2M node resource.

Herein, the resource management unit 20 deletes the M2M node resource to which the value of the node connection attribute of the AE resource or CSE resource points before being updated, when the AE resource having the same AE identity or the CSE resource having the same CSE identity as the created M2M node resource is searched and the value of the node connection attribute of the searched AE resource or CSE resource is not null.

Alternatively, the resource management unit 20 searches for, in the registered CSE locally, other M2M node resources having the same logical unit identity attribute value according to the value of the logical unit identity attribute in the created M2M node resource and deletes the searched other M2M node resources from the registered CSE locally.

Herein, the resource management unit 20 acquires the M2M node resource address carried in the resource deletion request when the M2M node resource deletion request is received. The resource management unit 20 searches for the value of the logical unit identity attribute in the M2M node resource corresponding to the address, and acquires the AE resource in which the AE identity is the same as the value of the logical unit identity attribute or the CSE resource in which the CSE identity is the same as the value of the logical unit identity attribute. Then, the acquired AE resource or CSE resource is deleted from the registered CSE locally.

Further, the M2M node resource corresponding to the M2M node resource address carried in the resource deletion request is deleted from the registered CSE locally.

The resource creation unit 10 and the resource management unit 20 described above may be implemented by a Central Processing Unit (CPU), a Micro Processing Unit (MPU), a Digital Signal Processor (DSP), or a Field-Programmable Gate Array (FPGA) of the apparatus for managing a M2M node.

The above methods and apparatuses for managing a M2M node will be described in further detail with reference to specific examples.

EXAMPLE ONE

In this Example One, with a smart meter as an example, the smart meter device is an M2M node in the present embodiment. The logical unit on the smart meter is the application for recording readings, i.e., the AE1. The application provider of the grid company management platform is the network side application, i.e., the AE2, which can manage the applications of smart meters and apparatuses on the platform. The service server provided by the operator is the registered CSE. The M2M node management process of Example one mainly includes the followings.

1. The AE1 sends a resource creation request to its registered CSE. The request message includes a resource type whose value is set to "AE." That is, the AE1 requires its registered CSE to create a resource with the "AE" type.

2. The registered CSE assigns an identity of the AE to the AE1, creates the resource "AE1" with the type "AE," and creates the attribute "AE identity" for the resource "AE1." The value of the attribute "AE identity" is set as the identity of the AE assigned by the registered CSE.

3. The AE1 sends a resource creation request to the registered CSE. The request message includes the identity and resource type of the AE1, wherein the value of the resource type is set to a "node."

4. After receiving the resource creation request, the registered CSE creates the resource "node 1" with the type "node," and sets the attribute "AE identity" of the resource as the identity of the AE in the request message.

5. The registered CSE searches for the attribute "AE identity" of the resource whose type is the "AE" locally according to the attribute "AE identity" of the resource "node 1." If there is the same "AE identity", the value of the attribute "node connection" of the AE resource is set as the address of the resource "node 1."

6. If the above value of the attribute "node connection" of the AE resource is not null before the update (for example, the apparatus carrying the AE1 fails, it is replaced with a new apparatus, but the same application is running, it is possible that the AE resource running thereon has been already associated with a certain node address when the changed node creates a resource), the registered CSE deletes the node resource to which the value of the attribute "node connection" of the AE resource points before being updated. For example, if the attribute "node connection" of the AE resource has a value of the address of "node X" before being updated, the resource "node X" is delete while the value of the attribute "node connection" is updated to the address of the resource "node 1."

Alternatively, the registered CSE searches for the attribute "AE identity" of the resource whose type is "node" locally according to the attribute "AE identity" of the resource "node 1." If there is the same "AE identity", the node resource is deleted. For example, if it is found that the attribute "AE identity" of the "Node X" is the same as the attribute "AE identity" of the newly created "node 1," the resource "node X" is deleted.

7. The AE2 sends a query resource request to the registered CSE, and acquires the addresses of the resources with all the node types.

8. The AE2 sends a delete resource request to the registered CSE, and the request message contains the address of the resource of the node to be deleted.

9. After receiving the deletion resource request, the registered CSE reads the attribute "AE identity" of the node resource according to the resource address contained in the request message, and searches for the attribute "AE identity" of the resource whose type is "AE" locally. If there is the same "AE identity," the resource is deleted.

10. The registered CSE deletes the resource "node 1."

EXAMPLE TWO

Example Two takes a smart home as an example. A self-managed smart television is used as a CSE1. As the registered CSE, a smart home gateway manages and provides service for a smart television. The service management system of the service provider is used as a CSE2. The M2M node management process of Example Two mainly includes the followings.

1. The CSE1 sends a resource creation request to its registered CSE. The request message includes the identity and resource type of the CSE1. The value of the resource type is set as "CSE." The request message also includes a CSE type.

2. The registered CSE creates the resource "CSE1" with the type "CSE," creates the attribute "CSE identity" for the resource "CSE1," and the value of creates the attribute "CSE identity" is set as the identity of the CSE1 contained in the request message.

3. The CSE1 sends a resource creation request to the registered CSE. The request message includes the identity and resource type of the CSE1. The value of the resource type is set as a "node."

The request message also includes the storage capacity of the node and the apparatus identity of the node.

4. After receiving the resource creation request, the registered CSE creates the resource "node 2" with the type "node," and sets the attribute "CSE identity" of the resource as the identity of the CSE1 in the request message.

5. The registered CSE searches for the attribute "CSE identity" of the resource whose type is the "CSE" locally according to the attribute "CSE identity" of the resource "node 2." If there is the same "CSE identity," the value of the attribute "node connection" of the CSE resource is set as the address of the "node 2."

6. If the above value of the attribute "node connection" of the CSE resource is not null before the update, the registered CSE deletes the node resource to which the value of the attribute "node connection" of the CSE resource points before being updated. For example, if the attribute "node connection" of the CSE resource has a value of the address of "node X" before being updated, the resource "node X" is deleted while the value of the attribute "node connection" is updated to the address of the resource "node 2."

Alternatively, the registered CSE searches for the attribute "CSE identity" of the resource whose type is "node" locally according to the attribute "CSE identity" of the resource "node 2." If there is the same "CSE identity", the node resource is deleted. For example, if it is found that the attribute "CSE identity" of the "Node X" is the same as the attribute "CSE identity" of the newly created "node 2," the resource "node X" is deleted.

7. The CSE2 sends a query resource request to the registered CSE, and acquires the addresses of the resources with all the node types.

8. The CSE2 sends a delete resource request to the registered CSE, and the request message contains the address of the resource of the node to be deleted.

9. After receiving the deletion resource request, the registered CSE reads the attribute "CSE identity" of the node resource according to the resource address contained in the request message, and searches for the attribute "CSE identity" of the resource whose type is "CSE" locally. If there is the same "CSE identity," the resource is deleted.

10. The registered CSE deletes the resource "node 2."

In view of the above, according to the embodiments of the disclosure, the AE or CSE is associated with the M2M node that carries the AE or CSE on their registered CSE. When deleting or replacing the M2M node, the corresponding deletion operation will be performed on the AE or CSE carried by the deleted or replaced M2M node on the registered CSE, thereby avoiding the storage of the failed AE or CSE resource in the registered CSE and effectively managing the storage space of the CSE.

The disclosure also provides a computer storage medium including a set of computer-executable instructions for performing the method for managing a M2M node according to an embodiment of the disclosure.

Those skilled in the art should understand that the embodiments of the disclosure can provide a method, a system or a computer program product. Thus, hardware embodiments, software embodiments or combined embodiments thereof can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the equipment (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that the processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

The foregoing is merely the specific embodiments of the disclosure, but the scope of protection of the disclosure is not limited thereto, and any variations or substitutions easily conceivable within the technical scope of the disclosure by people skilled in the art should fall within the scope of protection of the disclosure. Accordingly, the scope of protection of the disclosure should be in accordance with the scope of protection of the claims.

The invention claimed is:

1. A method for managing a Machine To Machine (M2M) node, comprising:
   receiving, by a registered Common Service Entity (CSE) from the M2M node, an M2M node resource creation request carrying an Application Entity (AE) identity or a CSE identity;
   creating, by the registered CSE, an M2M node resource according to the M2M node resource creation request, and setting, by the registered CSE, a value of a logical unit identity attribute in the created M2M node resource as the AE identity or the (CSE) identity;
   searching for, by the registered CSE locally, an AE resource having the same AE identity or a CSE resource having the same CSE identity as the created M2M node resource according to the value of the logical unit identity attribute in the created M2M node resource; and
   when the AE resource having the same AE identity or the CSE resource having the same CSE identity as the created M2M node resource is searched and a value of a node connection attribute of the searched AE resource or CSE resource is not null, updating, by the registered CSE, the value of the node connection attribute of the searched AE resource or CSE resource to an address of the created M2M node resource, and deleting, by the registered CSE, an M2M node resource to which the value of the node connection attribute of the searched AE resource or CSE resource points before being updated.

2. The method according to claim 1, further comprising: searching for, by the registered CSE locally, other M2M node resources having the same logical unit identity attribute value according to the value of the logical unit identity attribute in the created M2M node resource and deleting the searched other M2M node resources from the registered CSE locally.

3. The method according to claim 1, further comprising: acquiring, by the registered CSE, an address of an M2M node resource carried in an M2M node resource deletion request when the M2M node resource deletion request is received, searching for, by the registered CSE, a value of a logical unit identity attribute in the M2M node resource corresponding to the address of the M2M node resource carried in the M2M node resource deletion request, acquiring, by the registered CSE, an AE resource with an AE identity that is the same as the value of the logical unit identity attribute in the M2M node resource corresponding to the address of the M2M node resource carried in the M2M node resource deletion request or a CSE resource with a CSE identity that is the same as the value of the logical unit identity attribute in the M2M node resource corresponding to the address of the M2M node resource carried in the M2M node resource deletion request, and deleting, by the registered CSE, the acquired AE resource or CSE resource from the registered CSE locally; and deleting, by the registered CSE, the M2M node resource corresponding to the address of the M2M node resource carried in the resource deletion request from the registered CSE locally.

4. The method according to claim 2, further comprising: acquiring, by the registered CSE, an address of an M2M node resource carried in an M2M node resource deletion request when the M2M node resource deletion request is received, searching for, by the registered CSE, a value of a logical unit identity attribute in the M2M node resource corresponding to the address of the M2M node resource carried in the M2M node resource deletion request, acquiring, by the registered CSE, an AE resource with an AE identity that is the same as the value of the logical unit identity attribute in the M2M node resource corresponding to the address of the M2M node resource carried in the M2M node resource deletion request or a CSE resource with a CSE identity that is the same as the value of the logical unit identity attribute in the M2M node resource corresponding to the address of the M2M node resource carried in the M2M node resource deletion request, and deleting, by the registered CSE, the acquired AE resource or CSE resource from the registered CSE locally; and deleting, by the registered CSE, the M2M node resource corresponding to the address of the M2M node resource carried in the resource deletion request from the registered CSE locally.

5. An apparatus for managing a Machine To Machine (M2M) node, applied to a registered Common Service Entity (CSE) of an Application Entity (AE) or a CSE, the apparatus comprising:

a processor; and a memory for storing instructions, which when executed by the processor, cause the processor to when an M2M node resource creation request carrying an AE identity or a CSE identity is received, create an M2M node resource according to the M2M node resource creation request, and set a value of a logical unit identity attribute in the created M2M node resource as the AE identity or the CSE identity;

search for, in locally, an AE resource having the same AE identity or a CSE resource having the same CSE identity as the created M2M node resource according to the value of the logical unit identity attribute in the created M2M node resource; and when the AE resource having the same AE identity or the CSE resource having the same CSE identity as the created M2M node resource is searched and a value of a node connection attribute of the searched AE resource or CSE resource is not null, update the value of the node connection attribute of the searched AE resource or CSE resource to an address of the created M2M node resource, and delete an M2M node resource to which the value of the node connection attribute of the searched AE resource or CSE resource points before being updated.

6. The apparatus according to claim 5, wherein the instructions, when executed by the processor, cause the processor further to:

search for, in locally, other M2M node resources having the same logical unit identity attribute value according to the value of the logical unit identity attribute in the created M2M node resource and delete the searched other M2M node resources from the registered CSE locally.

7. The apparatus according to claim 6, wherein the instructions, when executed by the processor, cause the processor further to:

acquire an address of an M2M node resource carried in an M2M node resource deletion request when the M2M node resource deletion request is received, search for a value of a logical unit identity attribute in the M2M node resource corresponding to the address of the M2M node resource carried in the M2M node resource deletion request, acquire an AE resource with an AE identity that is the same as the value of the logical unit identity attribute in the M2M node resource corresponding to the address of the M2M node resource carried in the M2M node resource deletion request or a CSE resource with a CSE identity that is the same as the value of the logical unit identity attribute in the M2M node resource corresponding to the address of the M2M node resource carried in the M2M node resource deletion request, and delete the acquired AE resource or CSE resource from the registered CSE locally; and delete the M2M node resource corresponding to the address of the M2M node resource carried in the resource deletion request from the registered CSE locally.

8. The apparatus according to claim 5, wherein the instructions, when executed by the processor, cause the processor further to:

acquire an address of an M2M node resource carried in an M2M node resource deletion request when the M2M node resource deletion request is received, search for a value of a logical unit identity attribute in the M2M node resource corresponding to the address of the M2M node resource carried in the M2M node resource deletion request, acquire an AE resource with an AE identity that is the same as the value of the logical unit identity attribute in the M2M node resource corresponding to the address of the M2M node resource carried in the M2M node resource deletion request or a CSE resource with a CSE identity that is the same as the value of the logical unit identity attribute in the M2M node resource corresponding to the address of the M2M node resource carried in the M2M node resource deletion request, and delete the acquired AE resource or CSE resource from the registered CSE locally; and delete the M2M node resource corresponding to the address of the M2M node resource carried in the resource deletion request from the registered CSE locally.

9. A non-transitory computer storage medium having a set of computer-executable instructions stored therein, which when executed by a processor, cause the processor to perform a method for managing a Machine To Machine (M2M) node, wherein the method comprises:

receiving, by a registered Common Service Entity (CSE) from the M2M node, an M2M node resource creation request carrying an Application Entity (AE) identity or a CSE identity;

creating, by the registered CSE, an M2M node resource according to the M2M node resource creation request, and setting, by the registered CSE, a value of a logical unit identity attribute in the created M2M node resource as the AE identity or the CSE identity;

searching for, by the registered CSE locally, an AE resource having the same AE identity or a CSE resource having the same CSE identity as the created M2M node resource according to the value of the logical unit identity attribute in the created M2M node resource; and when the AE resource having the same AE identity or the CSE resource having the same CSE identity as the created M2M node resource is searched and a value of a node connection attribute of the searched AE resource or CSE resource is not null, updating, by the registered CSE, the value of the node connection attribute of the searched AE resource or CSE resource to an address of the created M2M node resource, and deleting, by the registered CSE, an M2M node resource to which the value of the node connection attribute of the searched AE resource or CSE resource points before being updated.

* * * * *